May 18, 1971 P. ZAHN ET AL 3,579,388

MODULAR THERMOGENERATOR

Filed April 11, 1968 2 Sheets-Sheet 1

INVENTORS
Veit Merges
Paul Zahn
By McGlew and Toren
ATTORNEYS

MODULAR THERMOGENERATOR

Filed April 11, 1968 2 Sheets-Sheet 2

INVENTORS
Veit Merges
Paul Zahn
By Mueller and Toren
ATTORNEYS

United States Patent Office 3,579,388

Patented May 18, 1971

3,579,388

MODULAR THERMOGENERATOR

Paul Zahn, Ottobrunn, and Veit Merges, Munich, Germany, assignors to Bolkow Gesellschaft mit beschrankter Haftung, Ottobrunn, Germany Filed Apr. 11, 1968, Ser. No. 720,662
Claims priority, application Germany, Apr. 29, 1967, B 92,311
Int. Cl. G21h 1/10
U.S. Cl. 136—202 10 Claims

ABSTRACT OF THE DISCLOSURE

A thermogenerator includes a selected number of identical modules mechanically and electrically assembled to form the thermogenerator. Each module includes at least two thermocouple elements having hot ends in thermal contact with a common heat source, such as a radioactive heat source, and cold outer ends in contact with cooling surfaces or radiators. The modules have outer walls permitting assembly of plural modules to form the modular thermogenerator.

BACKGROUND OF THE INVENTION

Thermogenerators comprising a plurality of thermocouples are known, and these thermogenerators include a single heat-emitting body with a number of thermocouples arranged around its surface, the number of thermocouples corresponding to the required output. The p-conductive and n-conductive elements, of thermoelectric material, have their hot sides or ends connected by contact bridges of electrically and thermally conductive material. Each of the thermocouples thus formed has its hot side connected, with the interposition of an electrically insulating layer, with a heat-emitting body and their cold sides or ends connected, again with the interposition of an electrically insulating layer, with a cooling surface, for example the so-called radiator.

When such thermogenerators are designed for extra-terrestial use, a low weight is desirable. Apart from the heat-emitting core, the weight of such a thermogenerator is determined by the heat transfer members cooperable with the hot and cold sides of the thermocouples, and by the generally relatively large radiator surfaces which project in the form of cooling ribs beyond the circumference of the compact thermogenerator. Independently of the desired output, the form of such a conventional thermogenerator is thus more or less determined at the start, so that such a thermogenerator can be used, with optimum effect, only in a certain power range related to a given geometry. For each particular power range, respective individual designs are necessary, and this is expensive and uneconomical.

The multitude of single thermocouple elements also results in a multitude of heat transfer points, which have an unfavorable effect on the heat flow, so that the output of these thermogenerators is decreased. These include the necessary electrical insulation between the bridge and the heat-emitting body, on the one hand, and between the cold sides and the cooling surfaces, on the other hand. In addition, the abundance of different single thermocouple elements has an adverse effect on the economical production of thermogenerators.

SUMMARY OF THE INVENTION

This invention relates to thermogenerators of the type comprising a radioactive heat source and a plurality of thermocouples in operative association therewith, and, more particularly, to an improved thermogenerator of this type comprising individual identical modules which may be assembled in a desired number in accordance with the desired output of the thermogenerator.

In accordance with the invention, the disadvantages of the prior art thermogenerators, as mentioned above, are obviated by providing a thermogenerator of a different configuration, which has a minimum of heat transfer points and is formed of identical elements so that it can be produced economically with sufficient mechanical strength and high efficiency without requiring large masses. Furthermore, the thermogenerator can be readily adapted, with respect to its output and with respect, to a certain extent, to its configuration, to the requirements of the respective application.

In accordance with the invention, a thermogenerator of this type is so constructed that the heat source and the structure are subdivided into identical modules, each containing at least two thermocouple elements whose outer surfaces have common contact interfaces to permit the assembly of the individual modules to form the thermogenerator. Each module is so designed that the hot sides of the thermocouple elements are connected metallically with the heat source, and the cold sides of the thermocouple elements are connected with the respective structural plates forming one outer surface of the module and acting as cooling surface. The spaces at least partly enclosed by the structural plates are filled with heat insulating material.

By virtue of the present invention, there is provided, for the first time, a thermogenerator consisting of identical joined modules each of which has its own heat source which is directly connected, without the interposition of additional elements hindering heat flow, with the heat radiating surface through the elements of the thermocouples. The power balance of the transformation of thermal energy into electrical energy thus becomes more favorable.

In addition, such modules provide, for the first time, for thermogenerators to be adapted, with respect to their outer configuration, size and power, to different applications without special expense or requiring new and respective designs. Since the mass of the individual heat sources is small, they can be supported, by means of the elements of the thermocouples, on the structure acting at the same time as a cooling surface, preferably as a radiator.

The container surrounding the radioactive material, which preferably is isotopes of higher power density like actinium 227 or curium 242, performs the function of the conventional bridge and, at the same time, establishes the electrical connection between the individual elements of each thermocouple. Because of the thickness of the walls of the container of the heat source, the electrical resistance thereof is negligible, so that a greater selection of materials is possible than has been the case heretofore. The thermal resistance of the conventional bridge is thus completely eliminated.

Another advantage of the invention is the increased ease of providing adequate contact between the thermocouple elements and the heat-resistant metal of the heat source container, as compared with the provision of adequate contact between the thermocouple elements and the material hitherto used for the bridges. The same ease holds true for the provision of adequate contact at the cold sides or ends of the thermocouple as here, also, the usual insulating layer is eliminated and it is merely necessary to connect metal surfaces to each other. Furthermore, the areal or generally planar design of the modules results in a better efficiency of the cooling surfaces.

A further advantage of the invention is that the heat expansion between the heat source and the cooling surface is absorbed, due to the inherent elasticity of the structure acting as a radiator, so that additional compensating elements, such as accumulators, etc., can be eliminated. Small, self-contained radioactive heat sources provide, in addition, greater safety against accidents in handling, shipping and take-off than do larger radioactive masses. An additional advantage is that, due to the smaller cross sections of the radioactive heat source the weights of the shields for the radioactive rays are reduced.

In a particularly expedient embodiment of the invention, each module is preferably a parallelepiped or cylinder, and includes at least two thermocouples connected in parallel. The n-conductive elements and the p-conductive elements of these thermocouples are arranged in the same plane, and the cold ends or sides are connected with a structural plate or sheet. The two outer surfaces parallel to the plane are joined with the adjacent modules, and the common edges of the structural plates or sheets are joined in either an electrically conductive manner or an electrically insulating manner, depending on the connection of the thermocouples.

The advantage of this arrangement is that, if one element of a thermocouple fails, the circuit of the module is kept closed by the other thermocouple thereof connected in parallel with the failed thermocouple. Since modules are particularly suitable for the construction of a bar- or rod-shaped thermogenerator, the individual modules can have a very low overall height in an axial or longitudinal direction of the bar rod, because of the association of the thermocouples with the heat source. The radiator surfaces, however, are relatively large compared to the size of the heat source of a module, but without the weight of a module, thereby being increased.

Such advantages are also characteristic of another embodiment of the invention in which each module is preferably a parallelepiped and has two thermocouples arranged opposite each other in one plane. The hot sides or ends of these thermocouples are fixedly connected with the heat source, while the cold sides or ends of each thermocouple element are connected in an electrically conductive manner with a radiator plate, the thermocouple elements being perpendicular to this radiator plate. Two radiator plates are associated with each thermocouple, and are electrically insulated or isolated from each other at their common edge forming one outer surface of the module.

Such modules can be used, with advantage, for plate-shaped thermogenerators, since the radiator plates forming the structure also form the frontal limitations of the parallelepiped. Thereby each parallelepiped, that is, each module, can be bounded at all surfaces in a peripheral direction by additional modules.

In addition to a cubic or square configuration of a module, other configurations are also possible, provided the association of the thermocouples with the heat source is so selected that the heat radiating surface or radiator always forms the outer surface of the thermogenerator, as would be the case, for example, in a module having the form of a circular sector.

An object of the present invention is to provide a thermogenerator free of the disadvantages of prior art thermogenerators.

Another object of the invention is to provide a thermogenerator having a configuration different from those hitherto known, and which has a minimum of heat transfer points.

A further object of the invention is to provide a thermogenerator consisting of a plurality of identical elements assembled together in a number corresponding to the desired output of the thermogenerator.

Yet another object of the invention is to provide a thermogenerator comprising identical modules each containing at least two thermocouple elements.

A further object of the invention is to provide such a thermogenerator in which each module is so designed that the hot ends of the thermocouple elements are connected metallically with a heat source and the cold ends with structural plates or sheets forming an outer surface of the module and acting as a cooling surface.

Still another object of the invention is to provide such a thermogenerator in which the spaces at least partly defined by the structural sheets or plates of a module are filled with heat insulating material.

A further object of the invention is to provide such a thermogenerator in which the individual heat source of each module is a radioactive material in a container which performs the function of a conventional bridge while establishing the electrical connection between the individual elements of each thermocouple.

Another object of the invention is to provide such a thermogenerator in which heat expansion between the heat source and cooling surface of each module are absorbed due to the inherent elasticity of the radiator structure.

A further object of the invention is to provide such a thermogenerator in which each of the modules includes a small, self-contained radioactive heat source.

Still another object of the invention is to provide such a thermogenerator in which each module includes at least two thermocouples in parallel whereby, if one thermocouple fails, the circuit of the module is maintained by the other thermocouple connected in parallel therewith.

BRIEF DESCRIPTION OF THE DRAWINGS

For an understanding of the principles of the invention, reference is made to the following description of particular embodiments thereof as illustrated in the accompanying drawings.

In the drawings.

DESCRIPTION OF THE PREFERRED EMBODIMENTS

Figure 1:
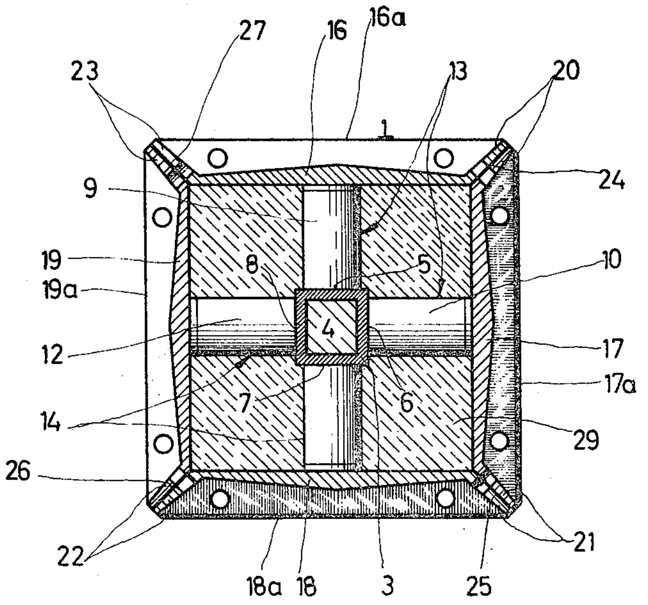
FIG. 1 is a transverse sectional view through a parallelepiped module embodying the invention.
Figure 2:
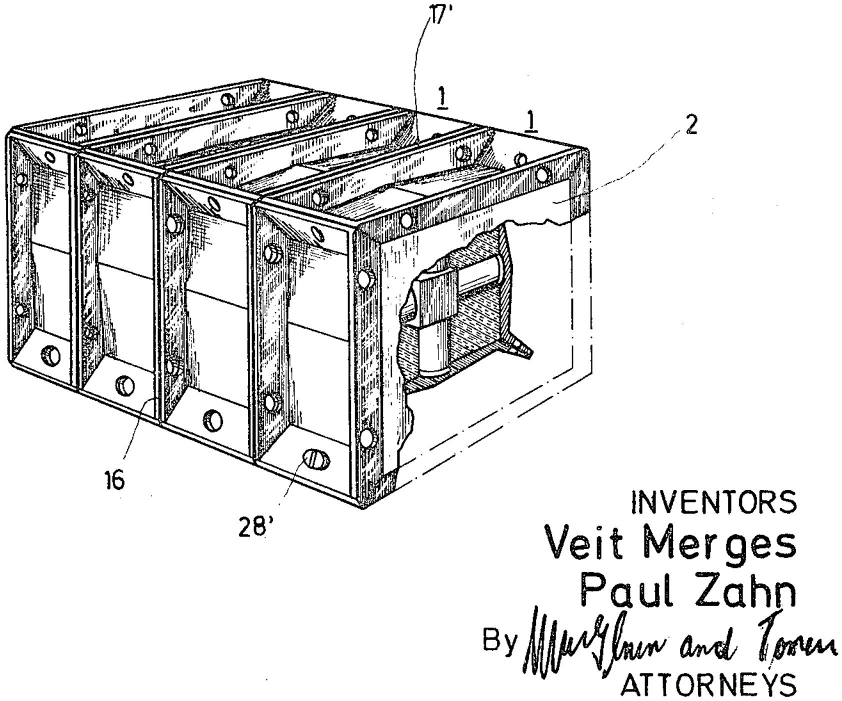
FIG. 2 is a perspective view, partly in section, of several modules, of the type shown in FIG. 1, united to form a bar or rod-type thermogenerator.

Referring first to FIGS. 1 and 2, a thermogenerator, as shown in FIG. 2, comprises a selected number of modules 1 each of which has its own heat source. As shown in FIG. 1, each module includes a heat source which is a preferably cubic container 3 of heat-resistant metal which is heated by and encloses a radioisotope 4. The material of container 3 is selected in accordance with the anticipated temperature and in accordance with the particular radioisotope used. If the container is gas-tight, for example, its strength must be sufficiently great that it can withstand the increasing internal pressure of the helium formed during the disintegration of the $\alpha$ rays.

Container 3 has outer surfaces 5, 6, 7 and 8 extending perpendicularly to the plane of the drawing, and the hot sides or ends of the elements 9, 10, 11 and 12 of thermocouples 13 and 14 are electrically connected to these outer surfaces. Thus, container 3 simultaneously forms the bridge connection between the elements of the thermocouples.

In the embodiment of the invention illustrated in FIG. 1, elements 9 and 11 of the thermocouples 13 and 14 are p-conductive and elements 10 and 12 are n-conductive, with all of the elements having a circular cross-section.

The cold sides or ends of the individual elements of the thermocouples are electrically connected to four outer walls of the module forming radiator plates 16, 17, 18 and 19 which extend perpendicularly to the drawing plane of FIG. 1. For the purpose of securing radiator plates 16–19 to each other, their end edges are provided, over the entire length thereof, with extensions 20, 21, 22 and 23 extending at an angle of 45° outwardly from the radiator plates. At the butt joints 24, 25, 26 and 27 of these extensions, the radiator plates 16–19 are electrically insulated or isolated from each other.

The extensions 20–23 of the radiator plates 16–19 are connected to each other by means of screws 28, for example, which must be provided with electrically insulating sleeves to insure electrical insulation of the plates from each other. In this manner, the two thermocouples of each module are connected in parallel with each other. The cavities or spaces enclosed by radiator plates 16–19 are filled with heat-insulating material 29 which simultaneously forms the frontal surfaces of each module.

The embodiment of a module shown in FIG. 1 is particularly suitable for the construction of a bar or rod-shaped thermogenerator, with the number of modules assembled to form the bar or rod depending on the required output of the thermogenerator. The individual modules are mechanically connected to each other by fastening means, for example screws, extending through aligned apertures in perpendicular extensions 16*a*–19*a* of the longitudinal edges of the radiator plates 16–19. This securement is effected in such a manner that the totality of the radiator plates forms the holding structure of the bar or rod-shaped thermogenerator, as can be seen from FIG. 2.

The joined modules 1 are connected electrically in series, so that two opposing edges of a module act, jointly with edges of the adjacent module or modules, as electrical conductors. Thus, edge 16′ of radiator plate 19 acts conjointly with a corresponding edge (not shown in FIG. 2) of radiator plate 18 as an electrical conductor, and edge 17′ of radiator plate 17 acts as a conductor conjointly with the corresponding edge (not shown in FIG. 2) of radiator plate 19. All of the other outer edges of adjacent modules are electrically insulated or isolated from each other. However, the outer planar surfaces of each thermogenerator composed of several modules 1 are closed by planar front plates 2 insulated at all contact edges or surfaces, these front plates 2 being shown partially in FIG. 2.

Figure 3:
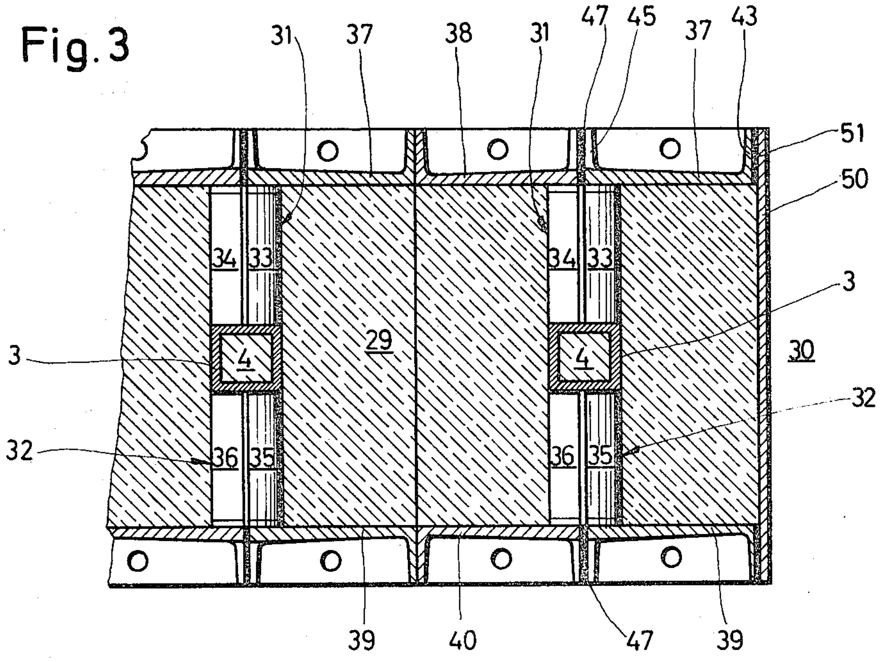
FIG. 3 is a transverse sectional view through parallelepiped modules in accordance with another embodiment of the invention.

FIG. 3 illustrates another embodiment of a module for a thermogenerator in accordance with the invention and, in FIG. 3, those parts corresponding to the embodiment of FIG. 1 have been given the same reference numbers.

Referring to FIG. 3, the container 3 for the radioactive isotope 4 has opposite outer surfaces connected with respective thermocouples 31 and 32 extending in the drawing plane of FIG. 3. Each of these thermocouples 31 and 32 consists of a p-conductive element 33 or 34 and an n-conductive element 35 or 36, respectively, the elements having a semi-circular cross section. The radiator plates associated with the two thermocouples of the module extend perpendicularly to the drawing plane of FIG. 3. Each radiator plate comprises two parts, such as the two parts 37, 38 associated with thermocouples 31 and the two parts 39, 40 associated with thermocouples 32. Thus, each element of each thermocouple is connected with one part of a radiator plate.

Figure 4:
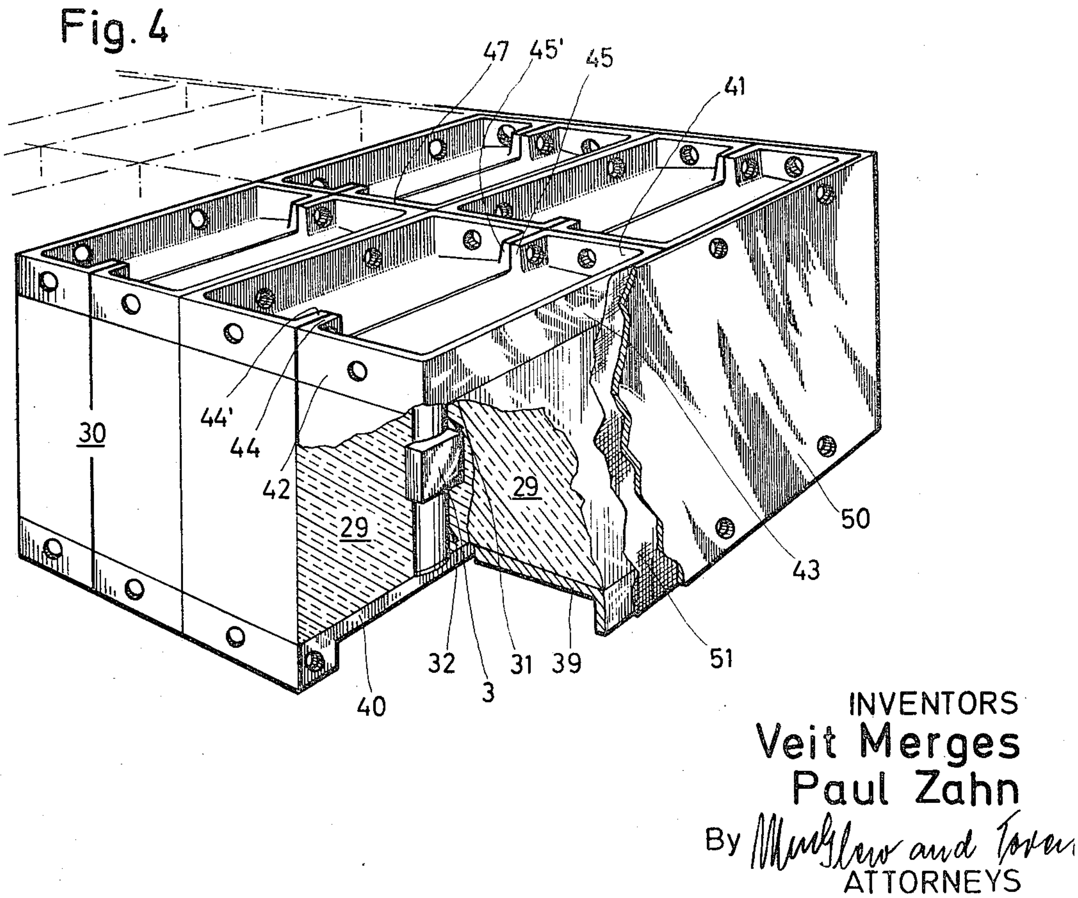
FIG. 4 is a perspective view, partly broken away and in section, of several modules, of the type shown in FIG. 3, assembled in face-to-face relation.

Each radiator plate section connected with a respective element of a thermocouple 31 or 32 has, extending along three sides thereof and integral therewith, an outwardly extending perpendicular extension or flange 41, 42 and 43. On that edge thereof coextensive with the diametrical plane surface of the associated thermocouple element, each radiator section has a pair of longitudinally spaced, inwardly extending, studs or ears 44 and 45 which also project outwardly from the associated edge and, in effect, form continuations of the respective flanges 42 and 41. As best seen in FIG. 4, each of these ears 44 and 45 is directly opposite the corresponding ears 44′ and 45′ of the adjoining radiator plate section of the same module, the opposing ears being interconnected mechanically for example by screws or bolts. At the areas of these interconnections, the ratiator plate sections are electrically insulated from each other, as best seen from FIG. 3. The modules 30 shown in some detail in FIG. 3 are particularly suitable, as shown in FIG. 4, for the formation of an arreal or planar thermogenerator since, utilizing modules 30, only the abutting edges of two radiator plates of adjacent modules need be connected electrically in the direction of current flow. If individual modules are terminated at more than two sides by adjacent modules, as is the case, for example, in a plate-shaped thermogenerator, only those contact surfaces of the individual module that extend in the direction of current flow serve as electrical conductors. However, the other contact surfaces are electrically insulated from each other, for example and preferably by thin dielectric plates or strips 47, as best seen in FIG. 4. In a peripheral direction, the limitations of each module 30 are formed by a heat-insulating filling 29 disposed in the space defined between container 3, thermocouples 31, 32 and radiator plates 37, 38, on the one hand, and 39, 40, on the other hand. Since such an insulating filling fills the space between the thermocouples of two adjacent modules 30, the individual modules preferably are provided with such insulating filling on only one surface.

In order to impart the necessary mechanical rigidity to the assembled thermogenerator, the plate-shaped modular thermogenerator of FIG. 4 is peripherally enclosed in its own frame 50 which is electrically insulated or isolated from the adjacent edges of the radiator plates by insulation 51.

Naturally, each thermocouple of the module embodiment shown in FIGS. 3 and 4 can be replaced here also by an element of a thermocouple, so that each module can contain only a single thermocouple. In such case, their radiator plates are preferably one piece, and are either electrically connected or electrically isolated during the assembly of the individual modules to form an areal thermogenerator in correspondence with the desired electrical connection.

While specific embodiments of the invention have been shown and described in detail to illustrate the application of the principles of the invention, it will be understood that the invention may be embodied otherwise without departing from such principles.

What is claimed is:

1. In a thermogenerator of the type including a radioactive heat source enclosed in a heat conductive container, a plurality of thermocouples in thermal contact with the container, and radiator means, forming a cooling surface, surrounding the thermocouples and in thermal contact therewith, the improvement comprising, in combination, plural identical modules constituting said thermal generator and having outer walls forming common contact surfaces juxtaposable to assemble the modules to form the thermogenerator; each module including a respective heat source forming a subdivision of said ratioactive heat source, a respective cooling surface structure forming a subdivision of said radiator means, and at least two respective thermocouples in thermal contact with said respective heat source and said respective cooling surface structure.

2. In a thermogenerator, the improvement claimed in claim 1, in which the hot sides of the thermocouple elements of each module are in metallic connection with the respective heat source, and the cold sides of the thermocouple elements of each module are in metallic connection with the respective cooling structure surface thereof.

3. In a thermogenerator, the improvement claimed in claim 2, in which each respective cooling surface structure comprises structural plates interconnected to form a peripheral surface of the associated module.

4. In a thermogenerator, the improvement claimed in claim 3, including heat insulating material filling the spaces at least partly defined by said structural plates.

5. In a thermogenerator, the improvement claimed in claim 3, in which each module has the form of a parallelepiped and includes at least two thermocouples connected in parallel with each other; the n-conductive elements and the p-conductive elements of said thermocouples being arranged in a common plane and each having its cold side connected with a respective structural plate; the two outer surfaces of the module parallel to such common plane being juxtaposable with the corresponding surfaces of adjacent modules; the adjacent edges of said structural plates being either electrically connected to each other or electrically insulated from each other in accordance with the desired connection of said thermocouples.

6. In a thermogenerator, the improvement claimed in claim 3, in which each module has the form of a cylinder and includes at least two thermocouples connected in parallel with each other; the n-conductive elements and the p-conductive elements of said thermocouples being arranged in a common plane and each having its cold side connected with a respective structural plate; the two outer surfaces of the module parallel to such common plane being juxtaposable with the corresponding surfaces of adjacent modules; the adjacent edges of said structural plates being either electrically connected to each other or electrically insulated from each other in accordance with the desired connection of said thermocouples.

7. In a thermogenerator, the improvement claimed in claim 3, in which each module has the form of a parallelepiped and includes two thermocouple elements having a semi-circular cross-section and arranged in substantially coaxial relation with the diametric plane surfaces facing with each other; the cold sides of said thermocouple elements each being connected with a respective structural plate extending perpendicular to the common axis of said thermocouple elements, each respective structural plate having its inner edge coplanar with the diametric plane surface of the associated thermocouple element; the outer surfaces of each module extending parallel to such axis being joined with corresponding outer surfaces of adjacent modules to form an areal thermogenerator; the adjacent outer edges of said structural plates being either connected electrically to each other or insulated electrically from each other in accordance with the desired electrical connection of the thermocouple elements.

8. In a thermogenerator, the improvement claimed in claim 7, in which the inner edge of each respective structural plate connected to the cold side of a thermocouple element is formed with apertured projections extending outwardly therefrom, the aperture projections of adjacent structural plates being aligned to receive fastening elements.

9. In a thermogenerator, the improvement claimed in claim 3, in which each module has the form of a parallelepiped and includes two thermocouples having a semicircular cross-section and arranged in substantially coaxial relation with the diametric plane surfaces facing with each other, the cold sides of said thermocouples each being connected with a respective structural plate extending perpendicular to the common axis of said thermocouples, each respective structural plate having its inner edge coplanar with the diametric plane surfaces of the associated thermocouples; the outer surfaces of each module extending parallel to such axis being joined with corresponding outer surfaces of adjacent modules to form an areal thermogenerator; the adjacent outer edges of said structural plates being either connected electrically to each other or insulated electrically from each other in accordance with the desired electrical connection of the thermocouples.

10. In a thermogenerator, the improvement claimed in claim 9, in which the inner edge of each respective structural plate connected to the cold side of a thermocouple is formed with apertured projections extending outwardly therefrom, the aperture projections of adjacent structural plates being aligned to receive fastening elements.

References Cited

UNITED STATES PATENTS

| | | | |
|---|---|---|---|
| 2,811,568 | 10/1957 | Lloyd. | |
| 3,234,048 | 2/1966 | Nelson | 136—212 |
| 3,252,205 | 5/1966 | Hancock et al. | 136—212X |

BENJAMIN R. PADGETT, Primary Examiner

H. E. BEHREND, Assistant Examiner

U.S. Cl. X.R.

136—205, 208, 212